3,388,189
COPOLYMERS FOR ACRYLIC FIBERS HAVING IMPROVED BASIC DYEING PROPERTIES COMPRISING ACRYLONITRILE, A CINNAMIC ACID AND VINYLACETATE OR VINYLIDENE CHLORIDE
Corrado Mazzolini and Sergio Lo Monaco, Mestre, Venezia, Italy, assignors to Monsanto Company, St. Louis, Mo., a corporation of Delaware
No Drawing. Continuation-in-part of application Ser. No. 260,838, Feb. 25, 1963. This application Apr. 8, 1963, Ser. No. 271,467
28 Claims. (Cl. 260—895)

This application is a continuation in part of U.S. application Ser. No. 260,838, filed Feb. 25, 1963 in the names of Corrado Mazzolini and Sergio Lo Monaco, now abandoned.

The present invention relates to new and valuable fiber-forming compositions, including copolymers of acrylonitrile and blends thereof which are suitable for the production of fibers having improved dyeing properties, and in particular improved basic dyeability.

It is known that the polymers and copolymers of acrylonitrile with other vinyl monomers such as vinyl acetate, methyl acrylate or methacrylate, and vinyl chloride as well as blends of these polymers and copolymers with other polymers and copolymers of monoethylenically unsaturated monomers are suitable for the production of fibers having excellent physical and textile properties. However, these polymer compositions are subject to certain inherent disabilities, including that of sufficient dye affinity to enable the development of satisfactory colors by means of basic or cationic dyestuffs, which greatly restrict their utility in the fabrication of general purpose fibers. The deficiency of fibers made from these polymer compositions insofar as it relates to their dyeability with basic or cationic dyestuffs arises since, as the sole groups reactive with the dyestuffs, the acrylic polymer compositions contain the sulfonic or sulfuric terminal groups arising from the fragments of the redox catalyst employed in the polymerization of these polymers and copolymers.

The dyeability of fibers formed from such acrylic polymer compositions with suitable basic or cationic dyestuffs, i.e. dyestuffs having a basic function which is reactive with the acid groups indicated above, therefore is inversely proportional to the length of the polymeric macromolecule since, the longer the molecules of the polymer, the less numerous the functional groups terminating the chains. However, it is not possible to obtain fibers of satisfactory physical properties by using polymers of very low molecular weight, as would be desirable from the standpoint of dyeing. Therefore, it is necessary to be satisfied in practice with a compromise between the two requirements, by limiting the molecular weight of the polymer to values which would not be the most satisfactory from the standpoint of the properties of the fiber obtained. Furthermore, even with these low values of molecular weight the dyeability of the fiber with basic or cationic dyes is still not entirely satisfactory, since it is not possible to obtain a very intense shade of color such as required in certain applications.

In order to increase the dyeability of acrylic polymer fibers, it has been proposed to employ in the polymerization monomers having a free acid function which, upon being polymerized together with acrylonitrile and other vinyl monomers, give rise to copolymers having, in addition to the terminal groups, other acid groups to which it is possible to fix the basic dyestuffs. It has also been proposed to produce polymers or copolymers of vinyl monomers having the free acid function for purposes of blending with acrylonitrile polymers or copolymers otherwise quite weakly dyed by basic or cationic dyestuffs. As comonomers for this purpose, i.e. direct polymerization with the acrylonitrile or other vinyl monomers to produce acrylic copolymers or for producing a blending polymer, there have been proposed various unsaturated carboxylic acids, or their corresponding anhydrides, including acrylic acid, methacrylic acid, itaconic acid, and the like. All of these monomers have the drawback of producing greater color in the polymers produced and the fibers spun therefrom, as well as adversely affecting the stability of the polymers and fibers produced to heat, and this effect has been found to be greater with the higher the percentage of carboxylic acid monomer employed. Therefore, from this standpoint it is desirable to obtain the maximum increase of dyeability by adding the minimum amount of acid monomer to the mixture of monomers for the production of the copolymers and blending polymers.

It has now surprisingly been found that cinnamic acid and its derivatives, namely acids of the general formula

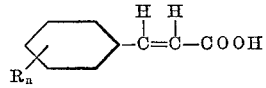

in which R represents a lower alkyl or halogen radical and $n$ represents an integer of from 0 to 3 inclusive, not only readily copolymerize with acrylonitrile and other vinyl monomers, but are also the most effective of all the acids indicated above in increasing the basic dyeability of the acrylic copolymers or blends derived therefrom.

By copolymerization with cinnamic acid or its derivatives the dyeability of the acrylonitrile copolymers can be increased as desired, and small percentages, not greater than 2% by weight of the polymer composition, are sufficient to give the improvements in dyeability which are desired in practice. Moreover, the cinnamic acid containing copolymers may be blended with other acrylonitrile polymers or copolymers which are not dyeable with basic dyes to produce a resulting polymer blend more readily dyeable with basic dyes. Furthermore, at these low percentages cinnamic acid or its derivatives do not change the color of the polymer, polymer blend or of the fibers obtained therefrom.

For the purposes of the present invention it has been found that cinnamic acid and derivatives thereof are suitable to accomplish the desired objects, namely carboxylic acids of the general formula

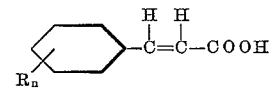

in which R represents a lower alkyl radical or a halogen atom, preferably chorine or bromine, and $n$ represents an integer of 0 to 3 inclusive. It is apparent that the anhydride of cinnamic acid can likewise be employed when the polymerization is conducted in the presence of water, as is the normal practice in the solution, emulsion, or suspension polymerization of acrylonitrile copolymers. Examples of suitable acid monomers include cinnamic acid and derivatives thereof, such as p-methyl cinnamic acid, p-ethyl cinnamic acid, p-isopropyl cinnamic acid, o-methyl cinnamic acid, m-ethyl cinnamic acid, 2,4-dimethyl cinnamic acid, 2,4-diethyl cinnamic acid, 3,5-dimethyl cinnamic acid, 3,4,5-trimethyl cinnamic acid, 2,4,6-triethyl cinnamic acid, 2,3,5-triisopropyl cinnamic acid, p-, m-, or o-chloro cinnamic acid, p-, m-, o-bromo cinnamic acid, 2,5-dichloro cinnamic acid, 2,4-dibromo cinnamic acid, 3,4,5-trichloro cinnamic acid, 2,4,6-tribromo cinnamic acid, and the like.

In the preparation of copolymers of the above carboxylic acids and derivatives thereof and acrylonitrile it has been found desirable to use from 0.05 to 2 percent by weight of the polymeric composition and to polymerize same in the presence of at least 80 percent of acrylonitrile and up to 19.95 percent of at least one other mono-olefinic monomer copolymerizable therewith. It has also been found that the above copolymers of acrylonitrile and cinnamic acid or derivative may be blended with other non-basic dyeable acrylonitrile polymers to produce a basic dyeable fiber-forming polymer composition. In accordance with this method the cinnamic acid or derivative is copolymerized with at least 80 percent acrylonitrile and up to 19.95 percent of at least one other mono-olefinic copolymerizable monomer in the same manner as above, and thereafter blended with the non-basic-dyeable acrylonitrile polymers in a proportion such that the final total polymer composition contains between 0.05 percent and 2.0 percent of the cinnamic acid or derivative monomer units in the total polymer composition.

For example, the fiber forming polymer may be a copolymer of from 80 to 99.95 percent of acrylonitrile, up to 19.95 percent of another copolymerizable mono-olefinic monomer, and from 0.05 to 2.0 percent of the cinnamic acid or derivative monomer, all in polymerized form. Suitable copolymerizable mono-olefinic monomers include acrylic, alpha-chloroacrylic and methacrylic acids, the acrylates, such as methyl acrylate, ethyl acrylate, butyl acrylate, methoxymethyl acrylate, beta-chloroethyl acrylate, and the corresponding esters of methacrylic and alpha-chloroacrylic acids; vinyl chloride, vinyl bromide, vinylidene chloride, 1 - chloro - 1 - bromoethylene; methacrylonitrile; acrylamide and methacrylamide; alpha-chloroacrylamide, or monoalkyl substitution products thereof; methyl vinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; N-vinyl carbazole; vinyl furane; alkyl vinyl esters; vinyl sulfonic acid and vinyl benzene sulfonic acids; ethylene alpha, beta-dicarboxylic acids or their anhydrides or derivatives, such as diethyl citraconate, diethyl mesaconate; styrene; vinyl naphthalene; vinyl-substituted tertiary N-heterocyclic amines, such as the vinylpyridines and alkyl-substituted vinylpyridines, for example, 2-methyl-5-vinylpyridine, and 1-vinylimidazole and alkyl-substituted 1-vinylimidazoles, such as 2-, 4-, or 5-methyl-1-vinylimidazole; and other mono-olefinic copolymerizable monomers.

As indicated above, the polymer composition can also be a blend of one of the above-described copolymers of cinnamic acid or its derivatives with acrylonitrile and/or one or more additional copolymerizable monoolefinic monomers together with from 2 to 20 percent of a copolymer of 10 to 70 percent acrylonitrile and 30 to 90 percent of at least one other copolymerizable mono-olefinic monomer as indicated above. Preferably, when the polymer comprises a blend, it will be a blend of from 80 to 98 percent of the first described copolymer, i.e., that containing acrylonitrile, cinnamic acid or its derivatives, and alternatively, one or more additional vinyl monomers, with a sufficient amount, from 2 to 20 percent, of a second copolymer of from 10 to 70 percent acrylonitrile and from 30 to 90 percent of a vinyl-substituted tertiary N-heterocyclic amine, such as 2-methyl-5-vinyl pyridine or 1-vinylimidazole, to give a blend having an overall vinyl-substituted tertiary N-heterocyclic amine content of from 2 to 10 percent, and an overall cinnamic acid or derivative content of from 0.05 to 2.0 percent, both based on the weight of the blend.

As a means for evaluating the basic dyeability of the copolymers and blends obtained, they are dyed at 100° C. for 2 hours with a solution of 7 grams per liter of a typical basic dyestuff, Sevron Blue 2 G (Color Index Basic Blue 22), and a quantity of dyestuff fixed is measured. Experience has shown that this measurement is in agreement with the dyeability of the fibers obtained. This measure has been selected, rather than the measurement of the dyeability of the fibers, since the latter depends on the interaction of several other variables, such as the orientation stretch to which the fiber has been subjected, the finishing agents applied to the fiber, final treatments undergone by the fiber, such as texturing, heat setting, after-stretching, and so forth. By measuring the dyeability of the polymer, there is obtained a very precise and more significant indication of the influence on the dyeability of the constitution of the polymer itself, as has been explained in the paper delivered by C. A. Bowers and T. H. Guion at the meeting of the Fiber Society at West Point, N.Y., on Oct. 13, 1961, entitled, "Equilibrium Absorption Studies of Cationic Dyes on Experimental Acrylic Polymers."

Dyestuffs suitable for use on the polymer compositions of the present invention are quite extensive. For example, for use on the copolymers of acrylontrile containing the indicated amounts of cinnamic acid or its derivatives practically any basic or cationic dyestuff can be used for dyeing the acrylonitrile copolymers under normal conditions, which are well known to one familiar with the dyeing art. On the blend compositions a great many of the basic dyestuffs will function satisfactorily. Among these are Fuchsine N Powder (C. I. Basic Red 9, C. I. 42,500), Genacryl Pink 3G) C. I. Basic Red 14, Genacryl Red 6B (C. I. Basic Violet 7, C. I. 48,020), Sevron Brilliant Red 3B (C. I. Basic Violet 15), Sevron Brilliant Red 4G) C. I. Basic Red 14), Sevron Red GL (C. I. Basic Red 18), Sevron Red L (C. I. Basic Red 17), Genacryl Orange G (C. I. Basic Orange 21, C. I. 48,035), Sevron Yellow R (C. I. Basic Yellow 11, C. I. 48,055), Sevron Yellow 3RL (C. I. Basic Yellow 15), Sevron Blue BGL (C. I. Basic Blue 35), Sevron Blue B (C. I. Basic Blue 21), Sevron Blue 2G (C. I. Basic Blue 22), Sevron Brown YL (C. I. Basic Orange 26), and many other basic dyestuffs for which Color Index numbers are not currently available.

The copolymers of cinnamic acid and its derivatives together with acrylonitrile and/or other mono-olefinic copolymerizable monomers may be prepared by mass, solution, suspension or emulsion polymerization procedures in the various manners well known in the art. A preferred method of polymerization involves a reaction in suspension in aqueous medium in the presence of suitable free-radical producing catalysts, and preferably redox catalyst systems. As catalysts, the peroxy catalyst such as the peroxides, persulfates, perborates and the like, both oil and water-soluble types, as well as azo derivative catalysts may be used. The preferred catalyst is a redox catalyst system employing as a reducing agent sufur dioxide, sodium bisulfite and other compounds of sulfur in the lower valent state along with the persulfate, percarbonate, peroxy, and perborate catalysts.

The polymers of the present invention may be spun into fibers from solutions in any of the well known acrylonitrile polymer solvents, such as N,N-dimethylformamide, N,N-dimethylacetamide, ethylene carbonate, gamma-butyrolactone, moist nitromethane, tetramethylene sulfone, dimethyl sulfoxide, dimethyl sulfone and the like as well as aqueous solutions of sodium thiocyanate, zinc chloride, lithium bromide, etc. Furthermore, the compositions of the polymers of the present invention in any of the acrylonitrile polymer solvents may be extruded or spun into filaments and fibers by any of the known methods for extruding such polymeric solutions, such as wet spinning, wherein the solution is extruded below the surface of the coagulating bath, dry spinning wherein the solution is extruded through a spinneret into a tower containing a counter-flowing extractant gas, usually heated, or dry jet-wet spinning, wherein the solution is extruded above the surface of a coagulating bath and the filaments collected below the surface of same. The filaments and fibers formed from the acrylonitrile polymer compositions of the present invention demonstrate the increased basic dyeability possessed by the polymers prior to extrusion and likewise demonstrate the superior fiber physical properties detailed above.

In the following examples, which are given solely by way of illustration and not of limitation, various copolymers of acrylonitrile and blends thereof are prepared in accordance with the usual methods of polymerization, setting forth the dyeability and the original color of the copolymers and blends in accordance with the invention and, by way of comparison, copolymers free of acid co-monomers or containing other co-monomers having a carboxylic acid function which do not fall within the scope of the present invention.

Examples 1-10

Into a three liter polymerization reactor, there are continuously fed two aqueous streams containing an amount of potassium persulfate catalyst varied in accordance with the intrinsic viscosity [N] which it is desired to obtain, from 0.2 to 0.6 percent by weight of the monomer mixture, and an amount of sulfur dioxide activator, partially neutralized with sodium bicarbonate, varied in accordance with the intrinsic viscosity desired, from 1.2 to 3.5 percent by weight based on the monomeric mixture, and a stream of monomers composed of a mixture of 92 percent acrylonitrile and 8 percent vinyl acetate, plus an additional amount of the vinyl carboxylic acid introduced to increase the dyeability. The amount of water added is at a rate of 2.3 liters (2300 grams) per hour and the amount of mixed monomer stream is at a rate of 0.5 liter (406 g.) per hour. From an overflow tube the aqueous suspension of a polymer obtained is discharged, filtered, repeatedly washed with water and with acetone and then again with water in order to eliminate all foreign substances and unreacted monomers, and thereafter dried in an oven at 80° C. for twelve hours. Under the standard polymerization conditions described there are obtained about 300 grams per hour of copolymer, in which the acrylonitrile and the vinyl acetate are copolymerized in approximate proportions of 94 parts of acrylonitrile and 6 parts of vinyl acetate. The following determinations are carried out on the resulting polymers:

(a) Intrinsic viscosity [N] in dimethylformamide, expressed in deciliters per gram $^{-1}$, from which there is calculated the molecular weight M of the copolymers obtained on the basis of the formula of Cleland and Stockmayer:

$$[N] = 2.33 \times 10^{-4} \times M^{0.75}$$

(b) Basic dyeability: the quantity of Sevron Blue 2G dyestuff fixed from a 7 gram per liter solution in 2 hours at the boil, (c) Color of the polymer: measured by a General Electric Integrator Spectrophotometer and expressed as values of purity (P) and brightness (B) as calculated from the tristimulus values derived from the spectrophotometer by the methods recommended by the Standard Observer and Coordinate System of the International Commission on Illumination, as fully set forth in the Handbook of Colorimetry, published by The Technology Press, Massachusetts Institute of Technology, in 1936.

The results obtained in comparative tests between a copolymer free of any carboxylic acid monomers, Example 1, copolymers containing cinnamic acid copolymerized in accordance with the present invention, Examples 2-7, and copolymers containing other comonomers having a carboxylic acid function, Examples 8-10, are set forth in the following table:

TABLE 1

| Example | Acid Comonomer Added | Milliequival. (as COOH) of co-monomer per 100 grams of monomer total | Percent by weight | [N] | Sevron Blue, 2G fixed Percent | Original color of polymer | |
|---|---|---|---|---|---|---|---|
| | | | | | | Purity | Brightness |
| 1 | None | | | 1.54 | 11.8 | 1.7 | 93.4 |
| 2 | Cinnamic acid | 2.0 | 0.3 | 1.70 | 13.3 | 1.9 | 95.2 |
| 3 | do | 3.4 | 0.5 | 2.00 | 11.7 | 1.3 | 95.9 |
| 4 | do | 3.4 | 0.5 | 1.58 | 16.9 | 2.0 | 94.4 |
| 5 | do | 3.4 | 0.5 | 1.39 | 19.0 | 1.6 | 92.2 |
| 6 | do | 6.8 | 1.0 | 1.60 | 18.5 | 1.7 | 94.0 |
| 7 | do | 13.5 | 2.0 | 1.79 | 25.0 | 2.6 | 94.2 |
| 8 | Acrylic acid | 6.9 | 0.5 | 1.60 | 14.2 | 1.8 | 94.5 |
| 9 | Crotonic acid | 6.7 | 0.575 | 1.47 | 11.7 | 2.0 | 94.4 |
| 10 | Itaconic acid | 6.9 | 0.45 | 1.60 | 16.0 | 1.9 | 94.6 |

In Table 1 above, the quantity of monomers added has been expressed as milliequivalents of carboxylic acid per 100 grams of mixture of monomers in order to establish a significant comparison. The respective quantities of cinnamic acid and the other carboxylic acids as a percentage by weight of the monomer mixture employed is also set out in Table 1.

In the case of the color measurements, the purity, P, indicates how close the shade of color is to neutral color (white-gray-black axis of the color). The brightness, B, indicates how close the color of the sample, measured by reflectance of the incident light, is to white.

All of the above polymers were spun under identical conditions from a dimethylformamide solution by normal wet spinning procedures into a coagulating bath of dimethylformamide and water, oriented by stretching, washed in boiling water, dried and collected. As a result of these spinnings, fibers were obtained having the properties set out in Table 2 below:

TABLE 2

| Fiber of copolymers of Example No. | Color of the fiber | | Dyebath exhaustion, percent dyestuff on the fiber |
|---|---|---|---|
| | Purity | Brightness | |
| 1 | 8.3 | 74.9 | 2.22 |
| 2 | 8.9 | 75.3 | 2.52 |
| 3 | 7.2 | 74.2 | 2.22 |
| 4 | 9.5 | 74.8 | 3.18 |
| 5 | 10.8 | 74.3 | 3.6 |
| 6 | 10.0 | 73.1 | 3.5 |
| 7 | 11.1 | 72.5 | 4.7 |
| 8 | 10.8 | 75.5 | 2.68 |
| 9 | 9.0 | 74.8 | 2.22 |
| 10 | 9.5 | 75.2 | 2.95 |

The dyeing tests on the fiber were carried out by dyeing the staple fiber at the boil for three hours with a liquor/fiber ratio of 50:1, using the basic dyestuff Astrazon Red BBL (not yet classified in the Color Index), and in Table 2 above there is indicated the maximum concentration of dyestuff, expressed as percent by weight on the fiber, at which complete exhaustion of the dye bath is obtained.

Examples 11 and 12

A monomer mixture composed of 91 percent acrylonitrile and 9 percent methyl acrylate is polymerized by the method of Example 1. Under these standard polymerization conditions there are obtained about 300 grams per hour of copolymer in which the acrylonitrile and methyl acrylate are copolymerized in proportions of 93 parts of acrylonitrile to 7 parts of methyl acrylate. The resulting copolymer has an intrinsic viscosity of 1.6, the amount of dyestuff absorbed from a solution of 7 grams per liter of Sevron Blue 2G is 11.1%, and the polymer has a purity of 1.5 and a brightness of 94.7.

The same polymerization as above is repeated by adding to the monomer mixture 3.4 milliequivalents of cinnamic acid per 100 grams of monomers (0.5% by weight). Under the standard polymerization conditions the amount of copolymer obtained is 300 grams per hour. The amount of methyl acrylate present in the copolymer is 7 percent. The intrinsic viscosity of the copolymer is 1.67, the amount of dyestuff absorbed from a solution of 7 grams per liter of Sevron Blue 2G is 16.5%, and the polymer has a purity of 1.7 and a brightness of 95.2.

Examples 13 and 14

A monomer mixture composed of 91 percent acrylonitrile and 9 percent methyl methacrylate is polymerized by the method of Example 1 above. Under these standard polymerization conditions there are obtained about 300 grams per hour of copolymer in which the acrylonitrile and the methyl methacrylate are copolymerized in proportions of 93 parts of acrylonitrile to 7 parts of methyl methacrylate. The copolymer has an intrinsic viscosity of 1.58, the amount of dyestuff absorbed from a solution of 7 grams per liter of Sevron Blue 2G is 11.5%, and the resulting polymer has a purity of 1.7 and a brightness of 94.0.

The same polymerization as above was repeated by adding to the monomer mixture 3.4 milliequivalents of cinnamic acid per 100 grams of monomers (0.5% by weight). The amount of copolymer obtained under standard polymerization condtions is 300 grams per hour. The methyl methacrylate is present in the copolymer to 7%. The intrinsic viscosity of the copolymer is 1.56, the amount of dyestuff absorbed from a solution of 7 grams per liter of Sevron Blue 2G is 16.8%, and the resulting polymer has a purity of 1.4 and a brightness of 94.5.

Example 15

The polymerization method of Example 1 is repeated by feeding a monomer mixture composed of 92% acrylonitrile by weight, 8% vinyl acetate by weight and methyl cinnamic acid in an amount of 3.4 milliequivalents per 100 grams of monomers (0.5% by weight). Under normal polymerization conditions there are obtained 300 grams of copolymer per hour in which the acrylonitrile and vinyl acetate are copolymerized in proportions of 94 parts of acrylonitrile to 6 parts of vinyl acetate. The copolymer has an intrinsic viscosity of 1.52, the amount of dyestuff absorbed from the 7 gram per liter solution of Sevron Blue 2G is 17% and the polymer has a purity of 1.9 and a brightness of 93.6.

Examples 16 and 17

There is polymerized by the method of Example 1, a monomer mixture composed of 92 perecnt acrylonitrile and 8 percent vinyl acetate. These standard polymerization conditions result in the formation of about 300 grams per hour of copolymer in which the acrylonitrile and vinyl acetate are copolymerized in proportions of 94 parts of acrylonitrile and 6 parts of vinyl acetate having a specific viscosity of 0.26, when 0.1 gram of the copolymer is dissolved in 100 ml. of N,N-dimethylformamide at 20° C. A blend of the above copolymer was prepared by blending 88 parts of this copolymer with 12 parts of a copolymer of approximately 50 percent acrylonitrile and 50 percent 2-methyl-5-vinyl pyridine and the polymer blend dissolved in the mutual solvent dimethylacetamide. The above polymer dope was spun into fibers from said solution by normal wet-spinning procedures, oriented, washed and dried as in Example 1 above. The resulting fiber was dyed from a dye bath of the basic dyestuff Astrazon Red BBL using a liquor/fiber ratio of 50:1 and the maximum concentration of dyestuff expressed as percent by weight on the fiber at which complete exhaustion of the dye bath is obtained, as in Table 2, Example 1 above, was 1.10%.

There was spun by the method of Example 1 an identical monomer mixture of 92 percent acrylonitrile and 8 percent vinyl acetate but also containing 6.8 milliequivalents of cinnamic acid per 100 grams of monomer mixture (1.0% by weight). Under the standard polymerization conditions of Example 1 there was obtained about 300 grams per hour of copolymer in which the acrylonitrile and vinyl acetate are copolymerized in proportions of 94 parts of acrylonitrile to 6 parts of vinyl acetate. The said polymer had a specific viscosity of 0.26 when measured as set forth above. This polymer in an amount of 88 parts was blended with 12 parts of a copolymer of 50 percent acrylonitrile and 50 percent 2-methyl-5-vinyl pyridine and wet spun under identical conditions as set forth above. However, in the fibers produced from the latter polymer blend the maximum concentration of dyestuff, expressed as percent by weight on the fiber at which complete exhaustion of a 50:1 liquor to fiber ratio dye bath of the same dyestuff is obtained, was 1.75%.

Examples 16 and 17 clearly demonstrate the superior dyeability with basic dyestuffs realized in blends of copolymers when one of the blended copolymers contains as a co-monomer cinnamic acid or derivatives in the amounts specified by the present invention.

One skilled in the art of the field of acrylic polymers and fibers will readily realize the advantages resulting from the use of cinnamic acid and its derivatives. To realize the same dyeability, there can be employed for the spinning of filaments and fibers a copolymer having a molecular weight of 175,000 ($N=2.0$) instead of 120,000 $N=1.54$), as demonstrated in Examples 1 and 3 above, with advantages both in the properties of the fiber because of the high molecular weight and in the whiteness thereof. With smaller increases in molecular weight or with larger content of cinnamic acid or its derivatives in accordance with the invention, the dyeability can be increased to about twice the value of the control polymer. Comparison with the other carboxylic acid monomers already suggested by the art clearly shows how much more effective cinnamic acid is as a means of increasing the basic dyeability of acrylic polymers and blends. Furthermore, Examples 16 and 17 clearly demonstrate that the improvement in basic dyeability as well as in whiteness and textile properties realized in copolymers are likewise realized in the fibers produced from the blends of acrylonitrile copolymers previously known in the art.

In conclusion it has been shown that cinnamic acid and its derivatives constitute a new, extremely useful means of favorably varying the dyeability of acrylonitrile copolymers and blends with the added ability to select the level thereof. This finding is all the more surprising if it is recalled that crotonic acid, having a double bond C=C within the molecule rather than at the end, evidently does not copolymerize, or copolymerizes only to an insignificant extent, with acrylonitrile, as shown by the fact that the basic dyeability of the resulting copolymer is not changed, cf. Example 10. Cinnamic acid has in common with crotonic acid the characteristic of the double bond C=C within the molecule rather than at the end, as has been true of the other carboxylic acid monomers suggested previously, and it is known that generally this property interferes with the ease of polymerization. In spite of the fact of the presence of the double bond within the molecule rather than at the end, however, cinnamic acid polymerizes readily with acrylonitrile and all other copolymerizable vinyl monomers, as has been demonstrated above.

As many widely differing embodiments of this invention may be made without departing from the spirit and scope thereof, it is to be understood that the invention is not limited to the specific embodiments except as defined in the appended claims.

What is claimed is:

1. A fiber-forming composition of matter of improved basic dyeability comprising a copolymer containing in polymerized form:
(a) at least 80 percent by weight of acrylonitrile,
(b) up to 19.95 percent by weight of at least one other copolymerizable mono-olefinic monomer selected from the group consisting of vinyl acetate and vinylidene chloride,
(c) and from 0.05 to 2.0 percent by weight of a carboxylic acid of the general formula

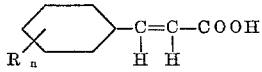

wherein R is selected from the group consisting of a lower alkyl radical and a halogen and $n$ is an integer of from 0 to 3 inclusive.

2. The composition of matter of claim 1 wherein the copolymerizable monolefinic monomer (b) is vinyl acetate.

3. The composition of matter of claim 1 wherein the copolymerizable monolefinic monomer (b) is vinylidene chloride.

4. The composition of matter of claim 1 wherein the carboxylic acid (c) is cinnamic acid.

5. The composition of matter of claim 1 wherein the carboxylic acid (c) is $p$-methyl cinnamic acid.

6. The composition of matter of claim 1 wherein the carboxylic acid (c) is $o$-methyl cinnamic acid.

7. The composition of matter of claim 1 wherein the carboxylic acid (c) is 2,4-dimethyl cinnamic acid.

8. The compositon of matter of claim 1 wherein the carboxylic acid (c) is 2,4-diethyl cinnamic acid.

9. A fiber-forming composition of matter of improved basic dyeability comprising a copolymer containing in polymerized form about 94 percent by weight of acrylonitrile, about 6 percent by weight vinyl acetate and from 0.05 to 1.0 percent by weight of cinnamic acid.

10. A fiber-forming composition of matter of improved basic dyeability comprising a copolymer containing in polymerized form about 94 percent by weight of acrylonitrile, about 6 percent by weight of vinyl acetate, and from 0.05 to 1.0 percent by weight of $p$-methyl cinnamic acid.

11. A fiber-forming composition of matter of improved basic dyeability comprising a polymer blend of:
(A) 80 to 98 percent by weight of a copolymer containing in polymerized form:
(a) at least 80 percent by weight of acrylonitrile,
(b) up to 19.95 percent by weight of at least one other copolymerizable mono-olefinic monomer selected from the group consisting of vinyl acetate and vinylidene chloride,
(c) and from 0.05 to 2.0 percent by weight of a carboxylic acid of the general formula

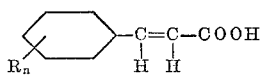

wherein R is selected from the group consisting of a lower alkyl radical and a halogen and $n$ is an integer of from 0 to 3 inclusive.
(B) and 2 to 20 percent by weight of a copolymer containing in polymerized form:
(a) 10 to 70 percent by weight of acrylonitrile,
(b) and 30 to 90 percent by weight of a vinyl-substituted tertiary N-heterocyclic amine,
(C) said blend being so proportioned that the vinyl-substituted tertiary N-heterocyclic amine comprises from 2 to 10 percent by weight of the blend.

12. The composition of matter of claim 11 wherein the vinyl - substituted tertiary N - heterocyclicamine is 2-methyl-5-vinyl pyridine.

13. The composition of matter of claim 11 wherein the copolymerizable mono-olefinic monomer (Ab) is vinyl acetate.

14. A fiber-forming composition of matter of improved basic dyeability comprising a polymer blend of:
(A) 80 to 98 percent by weight of a copolymer containing in polymerized form:
(a) about 94 percent by weight of acrylonitrile,
(b) about 6 percent by weight of vinyl acetate,
(c) from 0.05 to 1.0 percent by weight of cinnamic acid,
(B) and 2 to 20 percent by weight of a copolymer containing in polymerized form:
(a) about 50 percent by weight of acrylonitrile,
(b) and about 50 percent by weight of 2-methyl-5-vinylpyridine,
(C) said blend being so proportioned that the 2-methyl-5-vinylpyridine comprises from 2 to 10 percent by weight of the blend.

15. The composition of claim 14 wherein the 2-methyl-5-vinylpyridine (C) comprises about 6 percent by weight of the blend.

16. A method of producing a fiber-forming composition of matter of improved basic dyeability comprising:
(A) copolymerizing under polymerization conditions a mixture of copolymerizable mono-olefinic monomers comprising:
(a) at least 80 percent by weight acrylonitrile,
(b) up to 19.95 percent by weight of at least one other copolymerizable mono-olefinic monomer selected from the group consisting of vinyl acetate and vinylidene chloride,
(c) and from 0.05 to 2.0 percent by weight of a carboxylic acid of the general formula

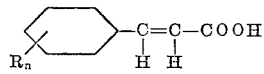

wherein R is selected from the group consisting of a lower alkyl radical and a halogen and $n$ is an integer of from 0 to 3 inclusive,
(B) in the presence of a polymerization catalyst therefor,
(C) and washing and recovering the resulting copolymer.

17. The method of claim 16 wherein
(a) the mixture of copolymerizable mono-olefinic monomers (A) is polymerized in an aqueous medium,
(b) and the polymerization catalyst (B) is a redox catalyst system.

18. The method of claim 16 wherein the copolymerizable mono-olefinic monomer (b) is vinyl acetate.

19. The method of claim 16 wherein the carboxylic acid (c) is cinnamic acid.

20. The method of claim 16 wherein the carboxylic acid (c) is $p$-methyl cinnamic.

21. A method of producing a fiber-forming composition of matter of improved basic dyeability comprising:
(A) copolymerizing under polymerization conditions a mixture of copolymerizable mono-olefinic monomers comprising:
(a) at least 80 percent by weight acrylonitrile,
(b) up to 19.95 percent by weight of at least one other copolymerizable mono-olefinic monomer selected from the group consisting of vinyl acetate and vinylidene chloride,
(c) and from 0.05 to 2.0 percent by weight of a carboxylic acid of the general formula

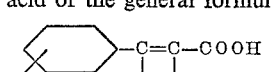

wherein R is selected from the group consisting of a lower alkyl radical and a halogen and $n$ is an integer of from 0 to 3 inclusive
(B) in the presence of a polymerization catalyst therefor, (C) washing and recovering the resulting copolymer,
(D) and blending 80 to 98 percent by weight of the resulting copolymer with from 2 to 20 percent by weight of a copolymer containing in polymerized form:
  (a) 10 to 70 percent by weight of acrylonitrile,
  (b) and 30 to 90 percent by weight of a vinyl-substituted tertiary N-heterocyclic amine,
  (c) said blend being so proportioned that the vinyl-substituted tertiary N-heterocyclic amine comprises from 2 to 10 percent by weight of the blend.

22. The method of claim 21 wherein
  (a) the copolymerizable mono-olefinic monomer (Ab) is vinyl acetate,
  (b) the carboxylic acid (Ac) is cinnamic acid,
  (c) and the vinyl-substituted tertiary N-heterocyclic amine (Db) is 2-methyl-5-vinylpyridine.

23. A basic dyeable textile fiber of the composition of claim 1.

24. A basic dyeable textile fiber of the composition of claim 9.

25. A textile fiber of the composition of claim 1 dyed with a basic dye.

26. A basic dyeable textile fiber of the composition of claim 11.

27. A basic dyeable textile fiber of the composition of claim 14.

28. A textile fiber of the composition of claim 11 dyed with a basic dye.

References Cited

UNITED STATES PATENTS

| | | | |
|---|---|---|---|
| 2,866,763 | 12/1958 | Sanders | 260—80.5 |
| 2,890,148 | 6/1959 | Dede | 260—80.5 |
| 3,028,371 | 4/1962 | Wishman et al. | 260—80.5 |
| 3,029,214 | 4/1962 | Hobson | 260—895 |

MURRAY TILLMAN, *Primary Examiner.*

E. E. WOODRUFF, D. J. BREZNER, M. J. TULLY
*Assistant Examiners.*